United States Patent [19]

White

[11] Patent Number: 5,108,058
[45] Date of Patent: Apr. 28, 1992

[54] CAMPING LIGHT HOLDER

[75] Inventor: David L. White, Norman, Okla.
[73] Assignee: B. T. Enterprises, Norman, Okla.
[21] Appl. No.: 336,663
[22] Filed: Apr. 11, 1989
[51] Int. Cl.$^5$ ............................................. A47G 29/00
[52] U.S. Cl. ................................... 248/126; 248/156; 248/207; 248/231.7; 248/532; 248/910
[58] Field of Search .................. 248/231.7, 126, 207, 248/156, 558, 545, 518, 530, 532, 535, DIG. 10

[56] References Cited

U.S. PATENT DOCUMENTS

| | | |
|---|---|---|
| 122,886 | 1/1872 | Hawkins . |
| 335,503 | 2/1886 | Butler . |
| 2,592,306 | 4/1952 | Maze .................... 248/518 X |
| 2,612,335 | 9/1952 | Saltzman ................ 248/558 X |
| 2,694,538 | 11/1954 | Consolo et al. ........ 248/535 X |
| 2,952,432 | 9/1960 | Valdez ................... 248/518 |
| 2,961,209 | 11/1960 | Willey ................... 248/535 X |
| 3,178,144 | 4/1965 | Kimoto .................. 248/207 X |
| 3,286,961 | 11/1966 | Mandolace ............ 248/518 |
| 3,333,807 | 8/1967 | Locatelli ............... 248/226 |
| 3,995,796 | 12/1976 | Kline ..................... 248/121 |
| 4,625,937 | 12/1986 | Haase .................... 248/545 |

FOREIGN PATENT DOCUMENTS 578073 6/1933 Fed. Rep. of Germany ...... 248/518

OTHER PUBLICATIONS

"L. L. Bean Spring Sporting Specialties 1989", p. 24.

Primary Examiner—David L. Talbott
Attorney, Agent, or Firm—Dunlap, Codding & Lee

[57] ABSTRACT

A camping light holder for maintaining a camping light a distance from a support structure is provided. The camping light holder includes a pole assembly, and a clamping assembly. The pole assembly includes a plurality of interconnecting sections. The pole assembly is inserted into a sleeve which is secured to the clamping assembly. The clamping assembly is removably secured to the support structure and includes a spike secured thereon for insertion into a penetrable support structure. A base may also be secured to the clamping assembly such that the camping light holder may be secured to support structures having a non-penetrable surface or a surface consisting of loose soil.

10 Claims, 3 Drawing Sheets

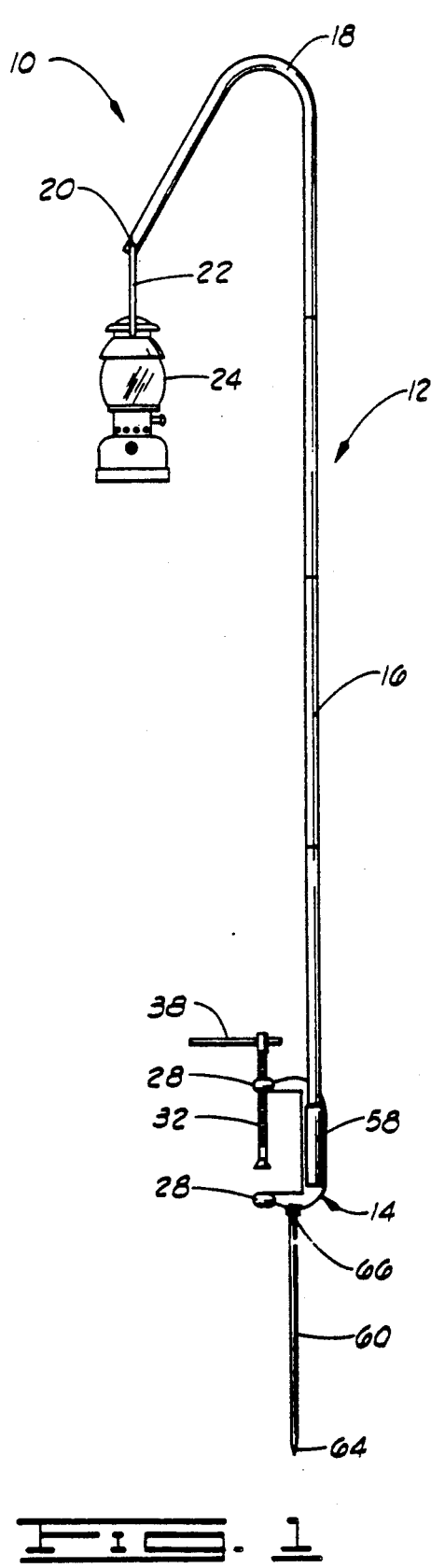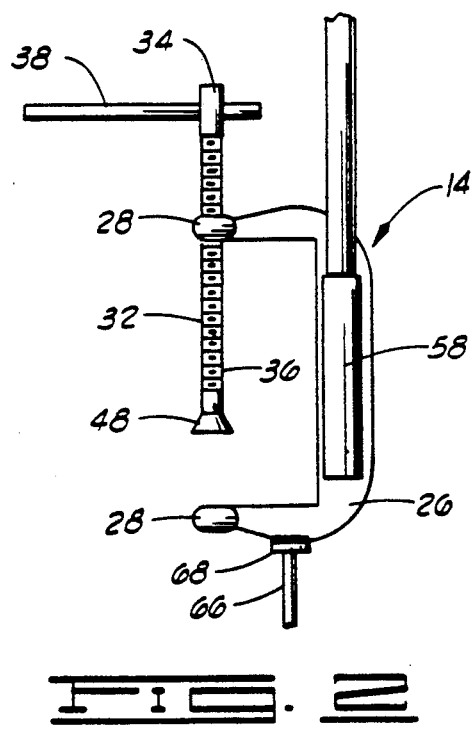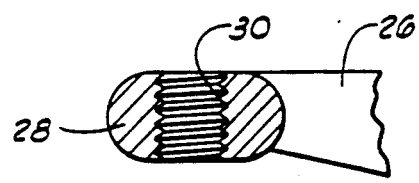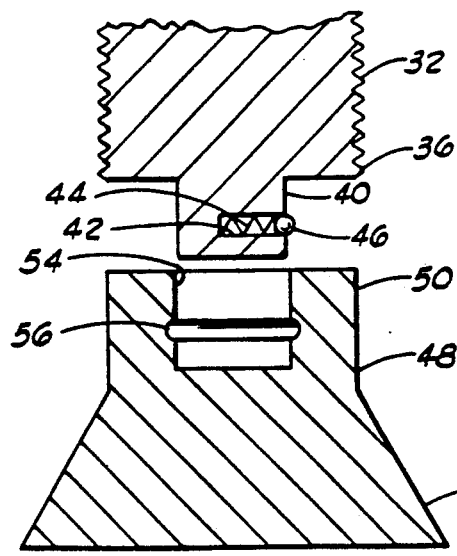

CAMPING LIGHT HOLDER

BRIEF SUMMARY OF THE INVENTION

1. Field of the Invention

The present invention relates generally to an apparatus for suspending a light a distance from a support structure.

2. Background of the Invention

The present invention provides an apparatus for supporting a camping light a distance from a support structure. In the present invention a pole assembly is detachably secured to a sleeve which is secured to a clamp assembly. The clamp assembly is constructed for attachment to a myriad of support structures.

BRIEF DESCRIPTION OF THE DRAWINGS

FIG. 1 is an elevational view of a camping light holder constructed in accordance with the present invention.

FIG. 2 is an enlarged elevational view of a clamp assembly.

FIG. 3 is an enlarged cross-sectional view of one of the fixed jaws of the clamp illustrating a threaded aperture therein.

FIG. 4 is an enlarged cross-sectional view of an end of the clamp screw illustrating a detachable jaw structure.

DESCRIPTION OF THE PREFERRED EMBODIMENTS

Figure 5:
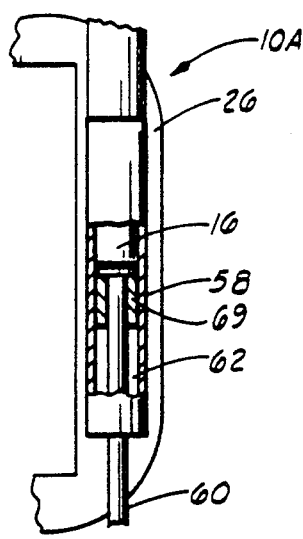
FIG. 5 is an enlarged fragmented elevational view of a modified camping light holder illustrating some internal structures.

As shown in FIG. 1, the present invention comprises a camping light holder designated generally by the reference numeral 10. The camping light holder 10 includes a pole assembly 12 and a clamp assembly 14.

The pole assembly 12 includes a plurality of detachable, interconnecting tubular sections 16 and an inverted V-shaped section 18 secured to the uppermost section 16. The free end of the section 18 has a notch 20 therein for receiving a bail 22 of a camping light 24.

One end of each section 16 and 18 (not shown) is reduced in diameter (FIGS. 6 and 7) such that each section may be secured to an adjacent section in an end to end fashion. The reduced diameter ends of each section, 16 and 18 are further sized such that one section may rotate within another. In this way, the camping light may be selectively positioned with respect to the clamping assembly 14 without detaching the clamping assembly 14 from the support structure.

As shown in FIGS. 2 and 3, the clamping assembly 14 includes a C-shaped frame 26 having a pair of facing fixed jaws 28. Each jaw 28 has a threaded bore 30 therein for receiving a clamp screw 32.

The clamp screw 32 has a first end 34 and a second end 36. The first end 34 has an aperture therein (not shown) for receiving a handle 38. As shown in FIG. 4, the second end 36 has a male connector 40 extending therefrom. A portion of the male connector 40 has an aperture 42 therein for receiving a spring 44 and a detent ball 46.

The clamping assembly 14 further includes a movable jaw 48 which is detachably secured on the second end 36 of the clamp screw 32. The jaw 48 has a first end 50 and an expanded second end 52. The jaw 48 also has an aperture 54 extending from the first end 50 towards the second end 52. The aperture 54 is sized for receiving the male connector 40. An annular groove 56 provided in the wall of the aperture 54 is for receiving a portion of the detente ball 46 such the jaw 48 may snap fit to the second end 36 of the clamp screw 32.

As shown in FIGS. 1 and 2, the clamping assembly 14 also includes a sleeve 58 and a vertical spike 60. The sleeve 58 is secured, as by welding, to the frame 26 between the jaws 28. The sleeve 58 has a vertical through bore 62 (FIG. 6) sized for receiving the reduced diameter end of one of the sections 16 of the pole assembly 12.

The spike 60 has a first end 64 and a second end 66. The first end 64 of the spike 60 is tapered to a point for insertion into a penetrable support surface. The second end 66 of the spike 60, having a head 68 thereon, is secured, as by welding, to the frame 26.

The camping light holder 10 may be secured to an elevated support structure, such as a table (not shown), by firmly compressing a portion of the table between one of the fixed jaws 28 and the movable jaw 48. The camping light holder 10 may also be secured to a penetrable support structure, such as the ground, by inserting the spike 60 to a sufficient depth therein.

A modified camping light holder 10A is illustrated in FIG. 5. The camping light holder 10A is similar to the camping light holder 10 except that the spike 60 is positioned within the sleeve 58. A ring 69, is secured, as by welding, within the bore 62 of the sleeve 58 and a portion of the second end 66 is secured, as by welding, to the ring 69. In this way, when the camping light holder 10A is secured to an elevated horizontal support structure, such as a table as described above, the clamping assembly 14 may be oriented such that the spike 60 extends above the table surface. In this way, one of the sections 16 may be inserted into the bore 62 such that the spike 60 is sheathed by the section 16.

Figure 6:
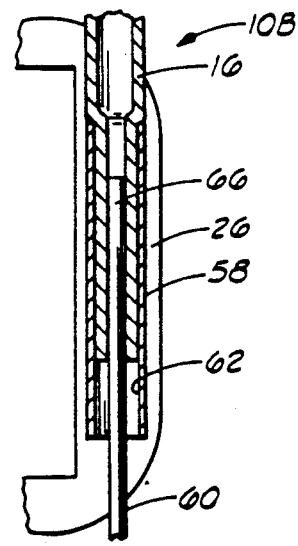
FIG. 6 is an enlarged fragmented elevational view of another modified camping light holder illustrating some internal structures.
Figure 7:
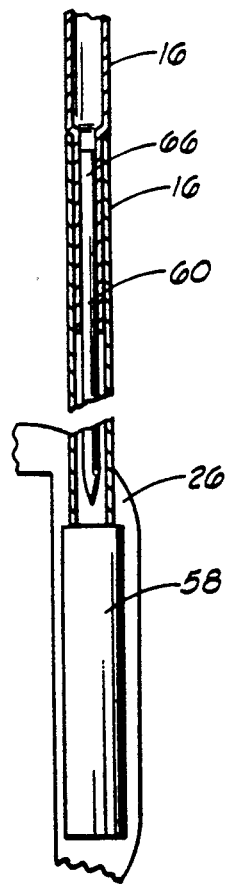
FIG. 7 is an enlarged fragmented elevational view of the camping light holder in FIG. 6 illustrating the spike enclosed within a portion of the pole assembly.

A modified camping light holder 10B is illustrated in FIGS. 6 and 7. The camping light holder 10B is similar to the camping light holder 10 except that the head 68 is removed from the spike 60 and the second end 66 thereof is secured within the tapered end of one of the sections 16. In this way, the spike 60 may be inserted into the bore 62 such that the spike 60 extends beyond the sleeve 58 (FIG. 6).

In this configuration, the camping light holder 10B may be secured to a penetrable support surface, such as the ground, by inserting the spike 60 into said support surface. Alternately, as shown in FIG. 7, when the camping light holder 10 is secured to a support structure, such as a table, the section 16 having the spike 60 attached thereto may be oriented such that the spike 60 is sheathed within an adjacent section 16 rather than the sleeve 58.

Figure 8:
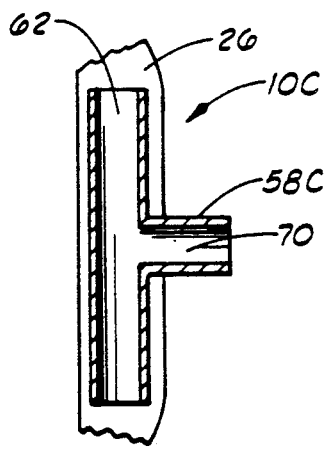
FIG. 8 is an enlarged vertical cross section of a modified sleeve.

A modified camping light holder 10C is illustrated in FIG. 8. The camping light holder 10C is similar to the camping light holder 10B except that the sleeve 58C is T-shaped having portions thereof defining a bore 70. The bore 70 is sized for receiving an end of one of the sections of the pole assembly 12. In this way, when the clamping assembly 14 is positioned for attachment to a substantially vertical support structure, such as a vessel transom, the bore 70 generally will be vertically oriented with respect to said support structure. Thus, the pole assemble 12 generally will be oriented at a right angle to the vertical support structure for supporting the camping light 24 a distance from said support structure.

Figure 9:
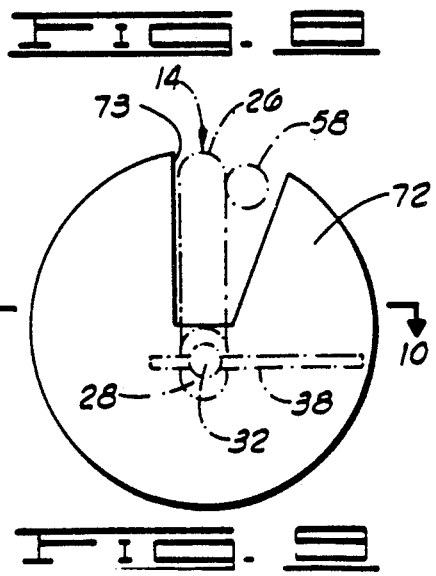
FIG. 9 is a top plan view of a base structure illustrating the camping light holder in phantom secured thereto.
Figure 10:
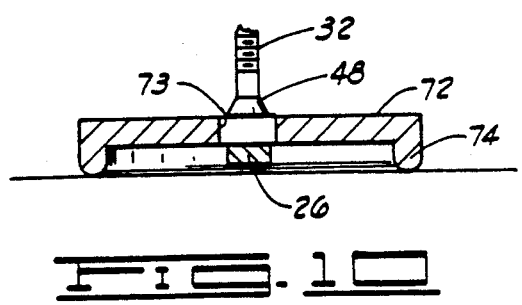
FIG. 10 is a cross-sectional view taken along lines 10—10 of FIG. 9.

As shown in FIGS. 9 and 10, the clamping assembly 14 of any of the above embodiments, 10, 10A, 10B or 10C, may also include a base 72. The base 72 is generally circular in shape and has a U-shaped slot 73 therein. Each of the said embodiments may be secured to the base 72 by compressing a portion of the base 72 adjacent apex of the slot 73 between one of the fixed jaws 28 and the movable jaw 48 of the clamping assembly 14.

The base 72 also includes a peripheral, downwardly extending shoulder 74. The shoulder 74 is of sufficient length such that portions of the frame 26 between the base 72 and a support structure are prevented from contacting said support structure (FIG. 10). In this way, the camping light holders 10, 10A, 10B or 10C, when attached to the base 72, are generally maintained in perpendicular alignment with the support structure. Thus, the base 72 may be combined with any of the above camping light holders 10, 10A, 10B or 10C for supporting the camping light a distance from a myriad of support structures.

Figure 11:
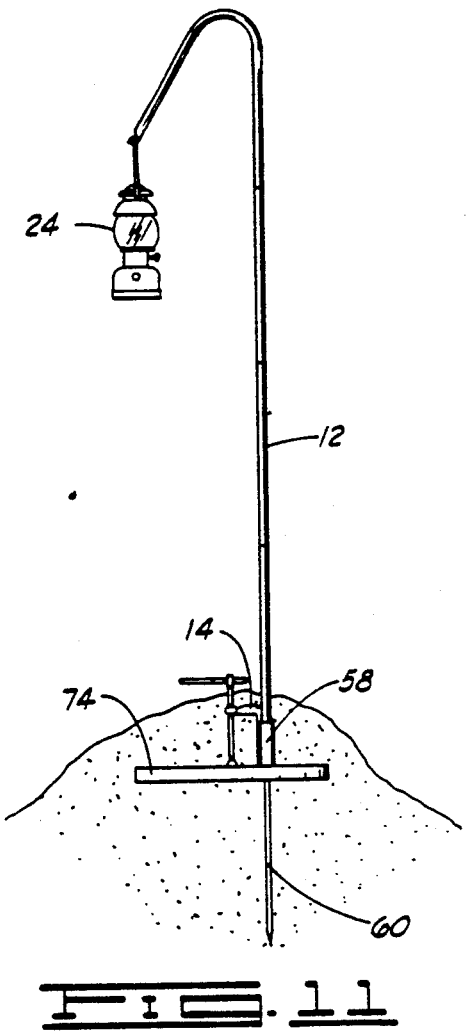
FIG. 11 is an elevation view of the camping light holder secured to a support structure.

For example, as shown in FIG. 11, the camping light holder 10, 10A or 10B in combination with the base 72 may be secured to support structure comprising loose or sandy soil. The camping light holder is secured to said support structure by securing the base 72 between the jaws 28 and 48 of the clamping assembly 14 and inserting the spike 60 into the soil. A portion of the soil may be position onto and around the base 72. In this way, the camping light holder is maintained in an upright position without inserting the spike 60 to an excessive depth within the soil or without the need for guide lines and guide line stakes.

Figure 12:
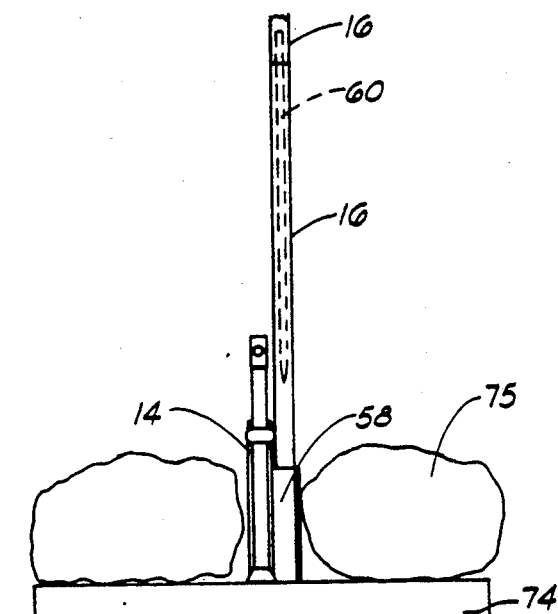
FIG. 12 is an enlarged fragmented elevational view of a modified camping light holder secured to a support structure.

Another example illustrating the use of the base and the light holder combination is shown in FIG. 12. The camping light holder 10B or 10C may be secured to a non-penetrable support structure by securing the base 72 within the clamping assembly 14 and sheathing the spike 60 within an adjacent section 16. One or more weighted objects 75 may also be placed upon the base 72 to assist in stabilizing the base and light holder combination. It will be understood that camping light holders 10 and 10A may also be secured to a non-penetrable surface in the above manner by threading the clamp screw 32 into the fixed jaw 28 adjacent the spike 60 and positioning the clamping assembly 14 such that the spike 60 is directed away from the support surface.

Figure 14:
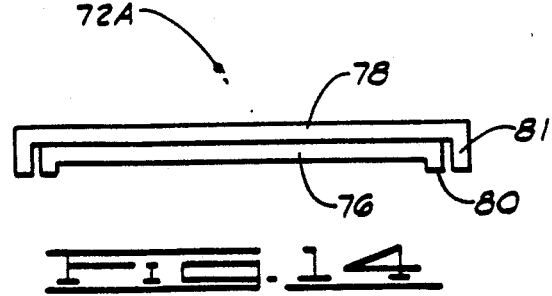
FIG. 14 is a side elevational view of the base structure illustrated in FIG. 13 in a storage position.
Figure 13:
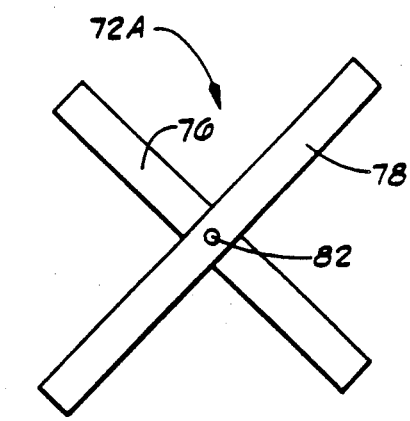
FIG. 13 is a top plan view of a modified base structure in an open position.

A modified base 72A is shown in FIGS. 13 and 14. The base 72A functions in a similar manner as the base 72. The base 72A includes a first member 76 and a longer second member 78. Each member 76 and 78 has a downwardly extending shoulder, 80 and 81 respectively, at the ends thereof. The shoulders 80 and 81 function in a similar manner as the shoulder 74 of base 72.

As shown in FIG. 13, the first and second members, 76 and 78, are pivotally secured through the respective centers by a pin 82. In this way, the base 72A may be configured in either a storage position (FIG. 14) or an open position (FIG. 13). It will be understood that the base 72A is secured between the jaws 48 and 28 of the clamping assembly 14 generally at the intersection of the first and second members, 76 and 78.

Changes may be made in the construction, operation, and arrangement to the various parts, elements, steps, and procedures described herein without departing from the spirit and scope of the invention as defined in the following claims.

I claim:

1. An apparatus to be mounted on a support structure for supporting a light having a bail comprising:
    a pole having a plurality of separable interconnecting sections;
    a spike secured to one of the interconnecting sections and extending therefrom such that the spike is insertable into a separate interconnecting section in an operating condition of the apparatus;
    means, integral with at least one of the interconnecting sections, for detachably receiving the bail;
    a clamp, wherein the clamp includes a clamp screw having a detachable moving jaw thereon, and a pair of facing jaws, and wherein each facing jaw is provided with means for receiving the clamp screw such that the position of the moving jaw between the facing jaws is adjustable; and
    a sleeve secured to the clamp, wherein the sleeve is sized for receiving an end of at least one of the interconnecting sections.

2. An apparatus to be mounted on a support structure for supporting a light having a bail comprising:
    a pole having a plurality of separable interconnecting sections;
    a spike secured to one of the interconnecting sections and extending therefrom such that the spike is insertable into a separate interconnecting section in an operating condition of the apparatus;
    means, integral with at least one of the interconnecting sections, for detachably receiving the bail;
    a clamp;
    a sleeve secured to the clamp, where the sleeve is sized for receiving an end of at least one of the interconnecting sections; and
    a base detachably secured to the clamp.

3. An apparatus to be mounted on a support structure for supporting a light having a bail comprising:
    a pole having a plurality of separable interconnecting sections;
    a spike secured to one of the interconnecting sections and extending therefrom such that the spike is insertable into a separate interconnecting section in an operating condition of the apparatus;
    means, integral with at least one of the interconnecting sections, for detachably receiving the bail;

a clamp;

a sleeve secured to the clamp, wherein the sleeve is sized for receiving an end of at least one of the interconnecting sections, and wherein the sleeve is characterized as having a vertical passage and a horizontal passage therein, wherein each passage is sized for receiving an end of at least one of the interconnecting sections.

4. An apparatus to be mounted on a support structure for supporting a light having a bail comprising:

a pole having a plurality of separable interconnecting sections;

means, integral with at least one of the interconnecting sections, for detachably receiving the bail;

a clamp;

a sleeve secured to the clamp, wherein the sleeve is sized for receiving an end of at least one of the interconnecting sections; and a spike secured within the sleeve and extending therefrom.

5. The apparatus of claim 4 wherein the clamp includes a moving jaw detachably secured to a clamp screw and a pair of facing jaws, wherein each facing jaw is provided with means for receiving the clamp screw such that the position of the moving jaw between the facing jaws is adjustable.

6. The apparatus of claim 4 further including a base detachably secured to the clamp.

7. The apparatus of claim 4 wherein the sleeve is characterized as having a vertical passage and a horizontal passage therein, wherein each passage is sized for receiving an end of at least one of the interconnecting sections.

8. An apparatus to be mounted on a support structure for supporting a light having a bail comprising:

a pole having a plurality of separable interconnecting sections;

means, integral with at least one of the interconnecting sections for detachably receiving the bail;

a clamp having a clamp screw with a detachable moving jaw positioned at one end of the clamp screw and a pair of facing jaws, wherein each facing jaw is provided with means for receiving the clamp screw such that the position of the moving jaw between the facing jaws is adjustable;

a spike secured to the clamp; and a sleeve secured to the clamp, wherein the sleeve is sized for receiving an end of at least one of the interconnecting sections.

9. The apparatus of claim 8 further including a base detachably secured to the clamp.

10. The apparatus of claim 8 wherein the sleeve is characterized as having a vertical passage and a horizontal passage therein, wherein each passage is sized for receiving an end of at least one of the interconnecting sections.

* * * * *